Dec. 12, 1950     J. T. W. MOSELEY     2,533,604
MANIFOLD CONSTRUCTION
Filed Aug. 7, 1947

INVENTOR.
JAMES T. W. MOSELEY
BY
George R. Ericson

Patented Dec. 12, 1950

2,533,604

UNITED STATES PATENT OFFICE 2,533,604

MANIFOLD CONSTRUCTION

James T. W. Moseley, Clayton, Mo., assignor to Carter Carburetor Corporation, St. Louis, Mo., a corporation of Delaware Application August 7, 1947, Serial No. 767,086

3 Claims. (Cl. 257—241)

This invention relates to manifold construction for internal combustion engines and consists particularly in novel means for utilizing the heat of the exhaust gases to vaporize drops of liquid fuel which may precipitate from the intake mixture without materially affecting the main body of carbureted air.

The manifolding of internal combustion engines, particularly of the automotive type, customarily, has been provided with a so-called "hot spot" by means of which hot exhaust gases are caused to circulate about a portion of the intake manifold. In order to reduce the effect of this heat under conditions when less heat is required, a thermostatically operated valve is usually provided for controlling the passage of exhaust gases through the hot spot. The difficulty with this arrangement is that if adequate heat is provided to vaporize precipitated drops, the main body of already gaseous fuel mixture is also heated so as to substantially reduce the density thereof and, consequently, the weight of fuel which reaches the engine cylinders.

It is, accordingly, the main object of the present invention to provide manifolding of the above type which is adapted to cause immediate vaporization of drops which may precipitate without materially affecting the main body of carbureted air.

Another object is to provide a portion on the intake manifold adjacent the fuel receiving riser which may be highly heated so as to promptly vaporize liquid particles which come in contact therewith.

Another object is to provide means for more quickly transferring heat from the exhaust gases to the intake manifold, particularly during the starting and warm-up period when excessively rich fuel mixture is being supplied.

Another object is to provide a highly heated portion of the intake manifold wall which is located close to the throttle valve and idle port so as to materially aid in preventing the formation of ice at these points.

Still another object is to eliminate the usual hot spot and control valve therefor.

These objects and other more detailed objects hereafter appearing are attained by the structure illustrated in the accompanying drawings in which.

Figure 1:
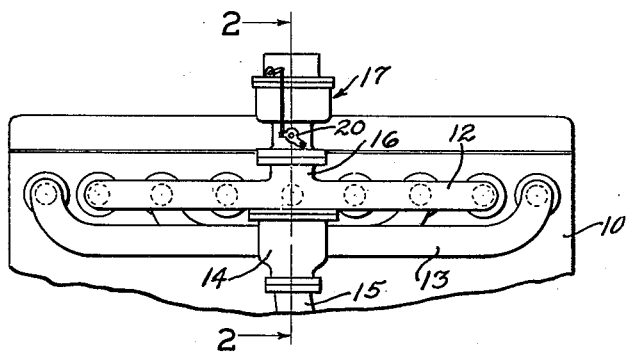
Fig. 1 is a side view showing a portion of an internal combustion engine including the intake and exhaust manifolds and carburetor.
Figure 4:
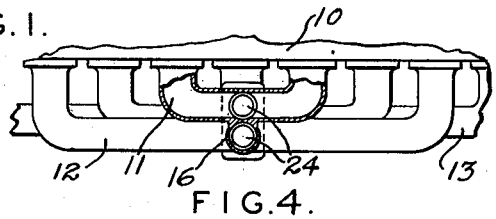
Fig. 4 is a section taken substantially on line 4—4 of Fig. 2.
Figure 2:
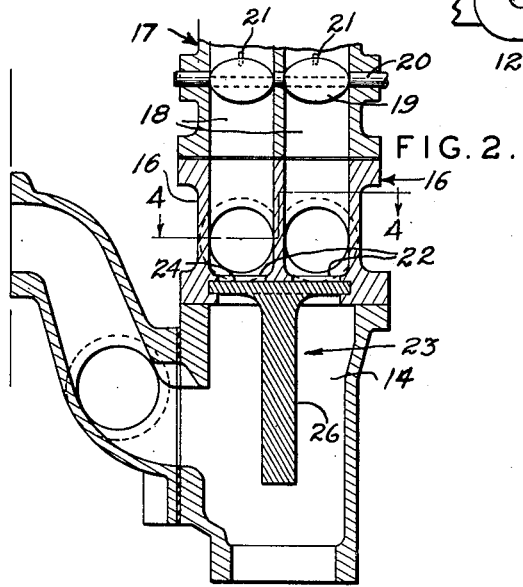
Fig. 2 is a section taken on line 2—2 of Fig. 1.

Figures 1 and 4 illustrate at 10 an internal combustion engine block of the eight cylinder type having dual intake manifolds 11 and 12. Below the intake manifolds is the exhaust manifold 13 forming a central chamber 14 connected at the bottom to exhaust pipe 15. Projecting above the central portions of intake manifolds 11 and 12 and immediately above chamber 14 is a riser 16 to which is attached a carburetor 17. The carburetor is of the dual type having a pair of induction conduits 18, each with a butterfly throttle valve 19 mounted on a shaft 20 which may be operated by any well known form of accelerator mechanism. Idle ports 21 are located immediately adjacent and slightly posterior to the edges of throttle valves 19 when in closed position. The exhaust and intake manifolds are separated except centrally where they abut at chamber 14 and have common walls 22. Wall portions 22 are provided with small openings directly in line with mixture conduits 18. A mushroom or T-shaped insert 23 of copper or other material of high heat conductivity is cast or otherwise seated in the common wall and extends across these openings so as to present relatively small exposed faces to the interiors of the intake manifolds as indicated at 24 in Fig. 4. These faces, preferably, though not necessarily, are located in slight depressions in the bottom walls of the intake manifolds so as to collect drops of liquid fuel.

The leg portion 26 of the copper insert projects into chamber 14 so as to present a substantial heat exchange surface to the hot exhaust gases.

In operation, the substantial portion of the insert exposed to the exhaust gases is quickly and highly heated and this heat is quickly transferred to the small surfaces of the head portion of the insert which are exposed to the interior of the intake manifold. Any liquid fuel which precipitates from the intake mixture and drops on these exposed surfaces is immediately vaporized. However, because of the small size of these surfaces and the much lower heat conductivity of the manifold castings themselves, the main body of intake mixture remains substantially cooler.

During cold starting, while the intake manifold itself and the carburetor are still fairly cool, icing may occur around the throttle and idle ports of the conventional manifold and carburetor installation. The quick transference of exhaust heat to the upper surface of the mushroom insert results in some of this heat being transmitted to the vicinity of the throttle valve and idle port. This transmitted heat, while sufficient to prevent or materially reduce icing, does not adversely affect the density of the main body of fuel mixture. This transfer of heat is further aided by the reduced height of the riser portion 16 because of elimination of the hot spot.

Figure 3:
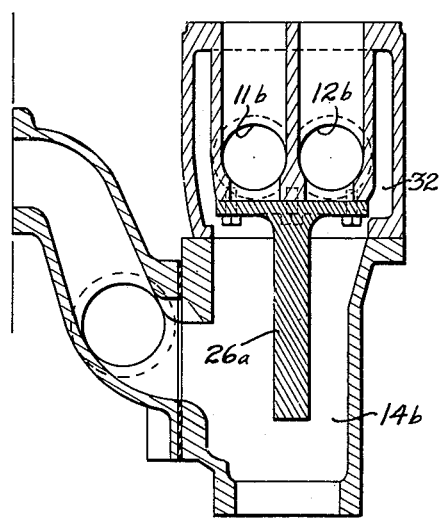
Fig. 3 is a section similar to Fig. 2, but showing a modification.

Figure 3 shows a modification in which a generally mushroom shaped insert 26a is bolted to the machined under surface of the intake manifold, instead of being cast therein, as in the previous form. This feature may be readily applied to an intake manifold originally constructed for use with a conventional hot spot arrangement.

The shape of the insert, particularly that portion thereof which projects into the exhaust manifold may be varied as may other details. The invention may be otherwise modified as will occur to those skilled in the art without departing from the spirit of the invention and the exclusive use of all modifications as come within the scope of the appended claims is contemplated.

I claim:

1. In combination, internal combustion engine intake and exhaust manifolds having closely adjacent lower and upper wall portions, respectively, said intake manifold having a fuel receiving riser immediately above said wall portions and arms extending laterally therefrom, and a substantially T-shaped insert of material more highly heat conductive than said manifold walls seated in said wall portions, the leg of said T presenting a substantial surface to the interior of said exhaust manifold and the cap of said T presenting a substantially smaller surface to the interior of said intake manifold directly beneath said riser and within the inner wall of said intake manifold for vaporizing liquid particles which drop thereon without materially affecting the main body of intake gases.

2. The combination specified in claim 1 in which the surface of said insert exposed to the interior of said intake manifold is located in a depression in the wall thereof for collecting drops of liquid fuel.

3. Internal combustion engine manifolding comprising an intake portion having a fuel receiving riser and a wall opposite said riser with a restricted aperture, an exhaust portion having a wall merging with the apertured portion of said intake wall, and a substantially T-shaped insert of highly conductive material with its cap portion seated on said merged wall and exposed through said aperture to the interior of said intake part, the leg portion of said insert projecting into said exhaust portion for quickly receiving heat from the exhaust gases and transmitting the same to said cap portion.

JAMES T. W. MOSELEY.

REFERENCES CITED

The following references are of record in the file of this patent:

UNITED STATES PATENTS

| Number | Name | Date |
|---|---|---|
| 1,479,567 | Horning | Jan. 1, 1924 |
| 1,490,921 | Godward | Apr. 22, 1924 |
| 1,567,810 | Mock | Dec. 29, 1925 |
| 1,953,888 | Moore | Apr. 3, 1934 |
| 1,981,876 | Moore | Nov. 27, 1934 |
| 1,990,662 | Moore | Feb. 12, 1935 |
| 2,256,990 | Roensch et al. | Sept. 23, 1941 |